United States Patent [19]
Shimada

[11] Patent Number: 6,101,167
[45] Date of Patent: Aug. 8, 2000

[54] PATH SWITCHING SYSTEM

[75] Inventor: Naohiro Shimada, Tokyo, Japan

[73] Assignee: NEC Corporation, Tokyo, Japan

[21] Appl. No.: 08/988,002

[22] Filed: Dec. 10, 1997

[30] Foreign Application Priority Data

Dec. 20, 1996 [JP] Japan .................................. 8-355037

[51] Int. Cl.[7] ............................... H04L 1/00; H04J 3/14; H04M 3/00
[52] U.S. Cl. ......................... 370/225; 370/242; 370/248; 240/825.01; 379/271
[58] Field of Search .................................... 370/217, 225, 370/227, 228, 242, 244, 248, 250; 340/825.01; 714/2, 3, 4; 379/271, 272, 733, 279

[56] References Cited

U.S. PATENT DOCUMENTS

| | | | |
|---|---|---|---|
| 4,396,984 | 8/1983 | Videki et al. | 379/273 |
| 5,602,828 | 2/1997 | Engdahl et al. | 370/228 |
| 5,721,727 | 2/1998 | Ashi et al. | 370/248 |
| 5,875,177 | 2/1999 | Uriu et al. | 370/248 |
| 5,896,496 | 4/1999 | Suzuki | 370/248 |
| 5,936,938 | 8/1999 | Weldon et al. | 370/228 |

FOREIGN PATENT DOCUMENTS

| | | |
|---|---|---|
| 4-96447 | 3/1992 | Japan . |
| 4-117741 | 4/1992 | Japan . |
| 4-361440 | 12/1992 | Japan . |
| 6-177968 | 6/1994 | Japan . |
| 7-183948 | 7/1995 | Japan . |
| 8-242230 | 9/1996 | Japan . |

*Primary Examiner*—Alpus H. Hsu
*Assistant Examiner*—Afsar M. Qureshi
*Attorney, Agent, or Firm*—Sughrue, Mion, Zinn, Macpeak & Seas, PLLC

[57] ABSTRACT

A path switching apparatus which performs high-speed switching for quick recovery of an entire network is provide. The apparatus in advance stores information on possibility that an error affects other paths and, upon detecting an error, investigates a possibility of the error affecting other paths with the use of the stored information, predicts further possible path error before it is actually detected, and based on predicted information, detection of error, switching judgment and/or switching are performed as necessary, thus recovering the entire network quickly.

10 Claims, 7 Drawing Sheets

FIG. 2

Path G Management Table

| Path (Path) | PathG (Path Group) |
|---|---|
| Path (1) (1) | PathG (1) |
| Path (1) (2) | PathG (1) |
| ⋮ | PathG (1) |
| Path (1) (m−1) | PathG (1) |
| Path (1) (m) | PathG (1) |
| ⋮ | ⋮ |
| Path (n−1) (1) | PathG (n−1) |
| Path (n−1) (2) | PathG (n−1) |
| ⋮ | PathG (n−1) |
| Path (n−1) (l−1) | PathG (n−1) |
| Path (n−1) (l) | PathG (n−1) |
| ⋮ | ⋮ |
| Path (n) (1) | PathG (n) |
| Path (n) (2) | PathG (n) |
| ⋮ | PathG (n) |
| Path (n) (k−1) | PathG (n) |
| Path (n) (k) | PathG (n) |

FIG. 3

Path G Relationship Table

| PathG (Path Group) | Path G Having the Same Source of Error |
|---|---|
| PathG (1) | PathG (1) |
| ... | ... |
| PathG (n-1) | PathG (1), PathG (2), ..., PathG (n-1) |
| PathG (n) | PathG (1), PathG (2), ..., PathG (n-1), PathG (n) |

FIG. 4

Path Characteristics Table

| Path | Service Class | Switching Priority |
|---|---|---|
| Path (1) (1) | CBR | Highest |
| Path (1) (2) | UBR | Highest |
| ⋮ | ⋮ | ⋮ |
| Path (1) (m−1) | UBR | Highest |
| Path (1) (m) | CBR | Highest |
| ⋮ | ⋮ | ⋮ |
| Path (n−1) (1) | ABR | Next Highest |
| Path (n−1) (2) | ABR | Next Highest |
| ⋮ | ⋮ | ⋮ |
| Path (n−1) (l−1) | ABR | Next Highest |
| Path (n−1) (l) | ABR | Next Highest |
| Path (n) (1) | CBR | Highest |
| Path (n) (2) | ABR | Highest |
| ⋮ | ⋮ | ⋮ |
| Path (n) (k−1) | VBR | Highest |
| Path (n) (k) | UBR | Highest |

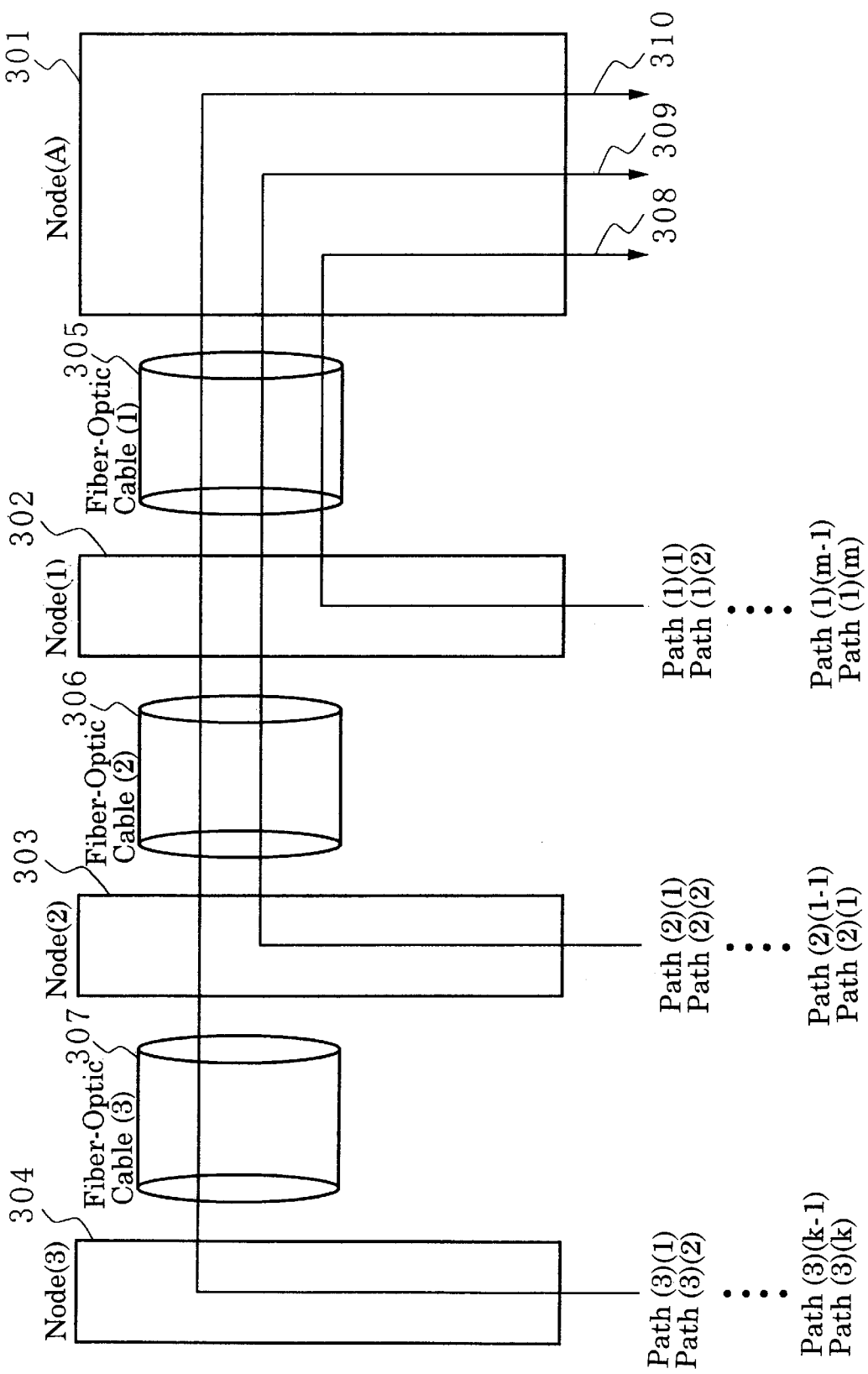

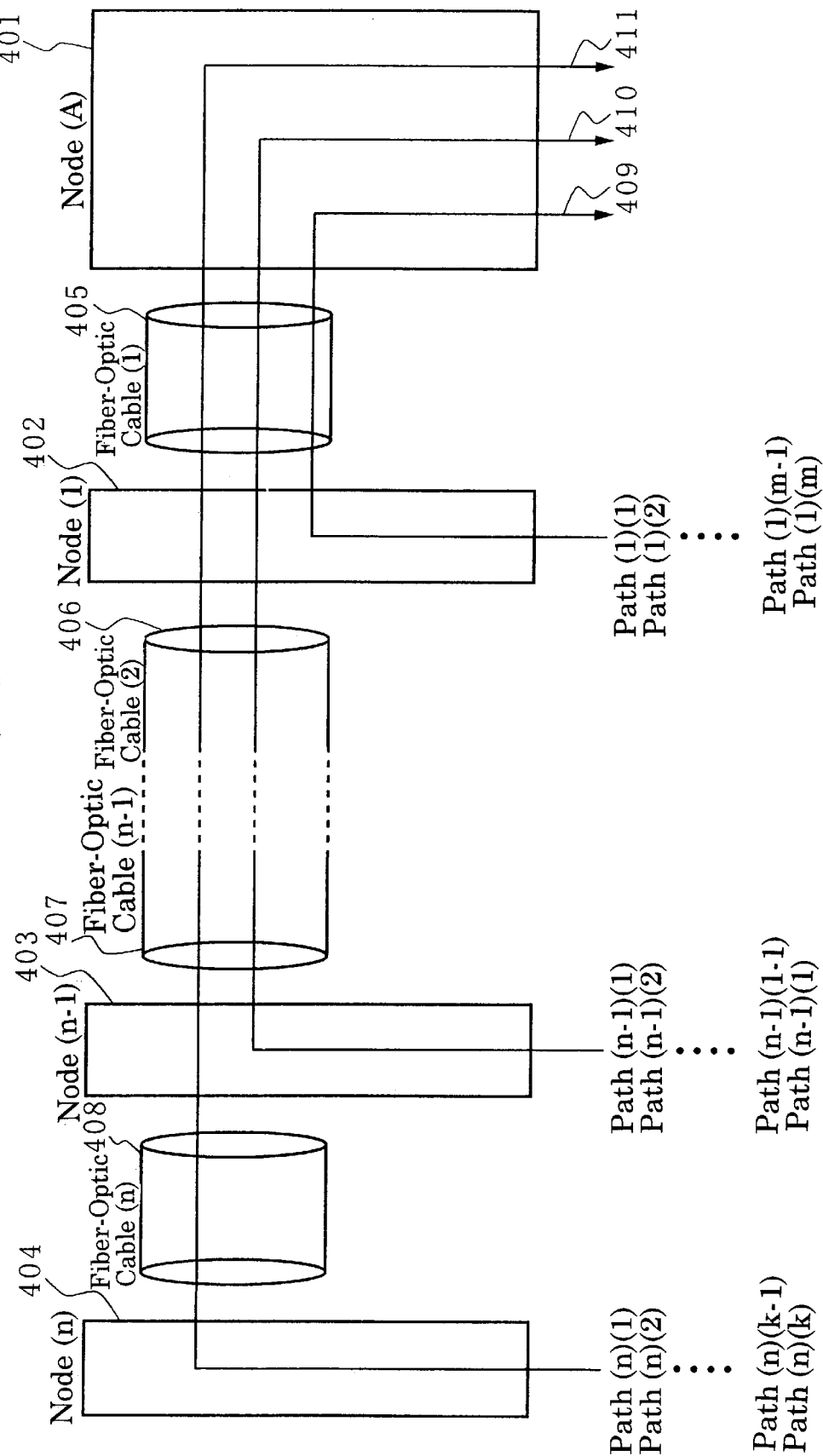

PATH SWITCHING SYSTEM

FIELD OF THE INVENTION

The present invention relates to a path switching system, and more particularly to a path switching system which protects provided services from errors that may occur in a network composed of a plurality of nodes.

BACKGROUND OF THE INVENTION

Conventionally, a path switching system for protecting a network against an error has been that, when a path error is detected by some means and only when an error alarm occurs, each path is switched in the event-driven manner independently—that is, without assigning recovery priority to paths or establishing an inter-path relationship.

For example, Japanese Patent Kokai Publication JP-A No. 4-96477 (Title of invention; Virtual path switching apparatus) discloses a path search system for use when a plurality of errors occur in a virtual path. A system described in this disclosure adds to a recovery control signal two types of information, that is, an identification number identifying a link where an error occurred and error recovery priority information indicating which of a plurality of errors is to be recovered with priority; the system then determines recovery priority, and creates bypass circuits, step by step. To do so, the system has recovery status recording means which keeps in storage several kinds of information: error recovery involvement information indicating whether a local communication node is connected to a failed link or the node is used for linking a bypass path, recovery progress status information indicating error recovery progress status, and determined priority information indicating which of a plurality of recovery control signals is to be processed with priority.

Recovery priority processing means adds to a recovery control signal on the other hand, a number identifying a failed link or communication node which was determined as failed when cut-off of a virtual path with an up-stream communication node was detected, and on the other hand adds the recovery priority information. When a plurality of recovery control signals were generated due to occurrence of a plurality of errors, the means determines the recovery priority based on the recovery priority information and establishes bypass circuits, step by step.

SUMMARY OF THE DISCLOSURE

In the course of investigation towards the present invention the following problems have been encountered in the conventional system.

As described above, the conventional path switching system is attempting to protect a network against an error when a path error is detected by some means in the following manner. The system identifies individual paths in the event-driven manner completely independently of each other and yet, only when an error alarm has occurred—that is, without detailed investigation in the recovery priority among the paths or establishing an inter-path relationship. This means that it will take a long time for the system to identify the path error.

Thus, as for a network or node in which a large number of paths are involved, the conventional system suffers a serious problem. That is, the processing load on the error detection and path switching increases as the number of paths increases, resulting in a time-consuming switching processing to entrain a slow switching.

In addition, when the signal arrival time varies according to the type of signal as in the Asynchronous Transfer Mode (ATM), it will take a very long time to detect an error of a signal which is sent over a line with a long interval.

Therefore, the present invention generally seeks to solve the problems associated with prior art described above. It is an object of the present invention to provide a path switching apparatus, system or method which performs a speed switching and network recovery.

Further objects will become apparent in the entire disclosure.

According to a first aspect of the present invention there is provided a path switching apparatus wherein, based on error detection information of a single- or a multiple-error in a network, possibility of errors in paths other than a path where the error occurred (referred to as "error possibility information") is previously investigated, and when an error has actually occurred detection of error(s), judgment/determination of switching, and execution of switching are performed based on the investigated information. The previous investigation comprises error simulation or error detection simulation of other errors assuming an error occurred in a path or paths within the system.

According to a second aspect, there is provided a path switching apparatus, wherein information on a possibility of a path error affecting other paths is stored in advance, wherein influence of a path error on other paths is predicted, and wherein when a path error has occurred, detection of error(s), judgment of switching and execution of switching are performed based on the predicted information.

According to a third aspect, there is provided preferably a path switching apparatus, wherein path group management information is stored in advance for use as information on a possibility of a path error affecting other paths, the path group management information grouping a plurality of paths passing though a same physical node and a same physical transmission line into a path group, wherein, upon occurrence of a path error, influence of the path error on other paths in a same group is predicted, and wherein based on the predicted information, detection of error(s) is performed as well as switching is judged and/or performed as necessary.

According to a fourth aspect, there is provided preferably a path switching apparatus, wherein path group relationship information is stored in advance, the path group relationship information representing influence of a node error or a transmission error on path groups each composed of a plurality of paths passing though a same physical node and a same physical transmission line, wherein, upon occurrence of a path error, an influence of the path error on other paths is predicted, and wherein path error detection is performed as well as path switching is determined, and/or performed as necessary, based on the predicted information.

According to a fifth aspect, there is provided preferably a path switching apparatus, wherein path characteristic information is stored in advance, the path characteristic information representing a service class and a switching priority of each path, and wherein, in case where a path error affects a plurality of paths, path switching urgency is determined based on the path characteristics information, and path switching is performed in the order of urgency.

According to a sixth aspect, there is provided a path switching apparatus, wherein path group management information and path group relationship information are stored which are used as information on an influence of a path error affecting other paths, and also path characteristics information which represents switching urgency is stored. These units of information are selectively combined and stored in advance. When a path error is detected, error detection of paths, judgment of switching (whether or not to switch) and execution of switching are performed, as necessary, based on the stored information.

According to a seventh aspect, there is provided a path switching system. The system comprises a stage of in advance storing information on the possibility of an influence of a path error affecting other paths; a stage of upon detecting a path error, predicting an influence of the path error on other paths based on the stored information; and as stage of enabling taking action in advance against a possible path error which is not yet detected but is predicted to occur.

In a further aspect, a path switching system comprises (a) means for predicting error possibility in other paths, assuming an error has occurred in a path, based on error detection information of a single-and/or multiple error in a network, (b) means for detecting an error in other paths, based on the predicted error possibility information, (c) means for judging if any of paths is switched, and (d) means for switching any of the paths based on information from the switching-judging means. The error detection information is stored grouped in path groups having a common error possibility associated with an error in a path or a path group.

In a still further aspect, the path switching system comprises (a) a path switching controlling module which controls switching of paths, (b) a plurality of error detecting modules each for a path group, (c) store means for storing path group management information representing an error possibility influenced by an error in a path, (d) store means for storing path group relationship information representing an error influence possibility in a path group affecting other path groups. The path switching controlling module performs: (i) in advance predicting error possibility in other paths, assuming an error has occurred in a path, based on information stored in the store means (c) and (d), (ii) detecting error in other paths based on the predicted information, and (iii) determining switching of the paths or path groups. The system further comprises store means for storing path characteristics information which represents urgency of switching, and the determining switching of the paths or path groups is carried out in the order of urgency.

Further aspects of the present invention will become apparent in the entire disclosure.

BRIEF DESCRIPTION OF THE DRAWINGS

FIG. 2 shows an example illustrating the contents of a path group management table used in an embodiment of the present invention.

FIG. 3 shows an example illustrating contents of a path group relationship table used in an embodiment of the present invention.

FIG. 4 shows an example illustrating contents of a path characteristics table used in an embodiment of the present invention.

FIG. 6 shows an example of connection configuration illustrating an embodiment according to the present invention.

FIG. 7 shows an example of connection configuration illustrating an embodiment according to the present invention.

DESCRIPTION OF THE PREFERRED EMBODIMENTS

Figure 1:
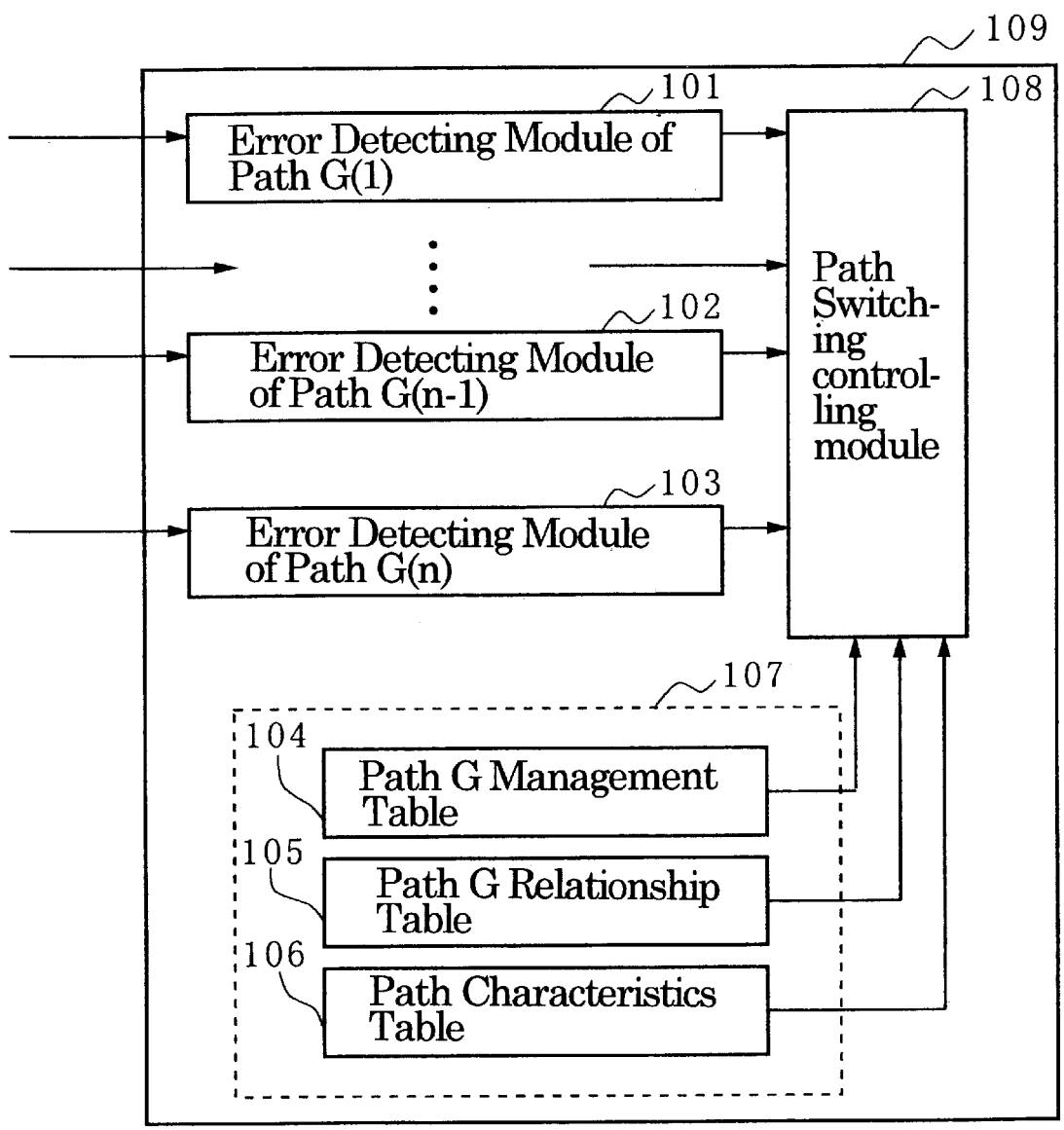
FIG. 1 is a sample configuration diagram of a path switching system used in an embodiment of the present invention.

Referring to the attached drawings, there is shown a preferred embodiment of the path switching apparatus or system according to the present invention. Assuming an error occurs in a path, a path switching system in the preferred embodiment of the present invention in advance analyzes and investigates a possibility that the error will affect other paths and in advance keeps (stores) the related/resultant information on the associated influenced error possibility.

When the path switching system finds (detects) that an error has occurred in one of the paths, it investigates an possibility of the influence of the error affecting the other paths based on information previously stored in the system and recognizes a possibility of an error occurring in one or more paths in which an error is not yet found. And, based on the information stored previously in the system, the system detects an error, determines whether or not to perform switching on any of the paths, and switches any of the paths as necessary.

Thus, the path switching system used in the embodiment of the present invention allows an overall network to be recovered quickly. Information stored previously in the system, which will be detailed later, includes information on the service classes and switching priorities of paths to be switched at each node and information on network configuration such as path groups each of which is composed of a plurality of paths passing through the same node and same (section of) fiber-optic cable.

Therefore, as compared with a conventional path switching system which switches individual paths independently to each other in an event-driven manner when a path error is detected and, as a result, an error alarm is caused, the path switching system according to the present invention can predict all the errors which may occur in other paths to take (start) action against those errors before they are actually determined.

That is, the path switching system used in the embodiment of the present invention can predict the error possibility in other paths, i.e., predict that errors will occur in other paths before they are actually detected (or even occur) and take action against them based on the predicted possibility information. For example, the path switching controlling module of the system causes the error detecting module to check if an error be present. This allows a path to be switched quickly and, as a result, the entire network to be recovered quickly.

In particular, in a network or a node in which a very large number of paths are connected (e.g., a maximum of 4096 virtual paths), the path error prediction method used in the embodiment of the present invention is most useful because it finds an error so quickly, occasionally before it actually occurs.

In an ATM network, the signals which are sent in cells are sent via many paths and buffers at varying speeds. This means that, in most cases, an error signal is not sent to all the nodes or lines in the network at the same time.

In this case, the embodiment of the present invention predicts possible other path errors occasioned by an error occurrence against which action can be taken, eventually before errors actually are detected or developed, minimizing the signal delivery delay caused by errors. In the case where the other path errors are already caused, a speedy determination of the errors is possible and the signal delivery delay is significantly reduced.

EMAMPLES

The above-mentioned embodiments of the present invention will be described in more detail with reference to the drawings.

FIG. 1 is a block diagram showing a configuration of an embodiment of the present invention. As shown in FIG. 1, a network node 100 used in the embodiment comprises error detecting modules 101–103 of path groups PathG (1)–PathG (n), an information storage module 107 composed of a path group (PathG) management table 104, a path group (PathG) relationship table 105 and a path (PathG) characteristics table 106, and a path switching controlling module 108.

In one embodiment of the present invention, assume that a plurality of paths passing through the same node and the same transmission line are grouped into a path group (PathG). Error check is done for each path or each path group (PathG), and obtained error detection information is sent to the path switching controlling module 108 in real time.

On the other hand assume that the path switching controlling module 108 already contains information sent from the path group (PathG) management table 104, the path group relationship table 105, and path characteristics table 106.

It is possible to preliminarily consider the influence of an error in a path which might effect other paths, with the use of information contained in the tables described above. That is, upon actually detecting an error in a path, the system checks information previously stored in the above-described tables in order to examine a possibility of the error affecting other paths and, in some cases, finds a further possible path error before it is detected. Preliminary identification/examination of the possibility of an error occurring in other paths before it actually occurs allows the system to detect the error, to determine whether to switch paths, and to perform switching sooner if necessary.

The operation of the embodiment is described below with reference to FIG. 7. Assume now that an error has occurred on Path (1) (1) at node (A).

In this case, note that Path (1) (2) and Path (1) (3) pass through the same nodes and the same transmission line as Path (1) (1) because they all belong to the same path group. Thus, although an error is not yet found in Path (1) (2) and Path (1) (3), there is a possibility that the error will occur in them likewise in Path (1)(1).

The path group management table 104 (see FIG. 2) contains path group information indicating each group of paths which pass through the same nodes and the same transmission line. This table helps the system focus on the paths (i.e., give priority in checking), which belong to the path group to which the failing path belongs, when checking to see if an error exists.

That is, instead of detecting an error and then taking a corrective action, the system first examines the possibility of a path error and, if the possibility of error is determined, an error determination operation is started before the error is detected in order to effectively perform the subsequent recovery operation. This makes it possible for the system to quickly switch the paths in which the errors occurred and to recover the entire network quickly.

FIG. 2 shows an example of the path group management table 104. The path group management table 104 in FIG. 2 contains information of the path groups each composed of a plurality of paths passing through the same nodes and the same transmission line. When the system detects any one path error, it identifies one or more paths on which error may occur, based on the information contained in this path group management table 104, and with priority checks if an error has occurred.

The system also has information to be stored such as the path group relationship table 105 and the path characteristics table 106.

FIG. 3 shows an example of path group relationship table 105, which contains information on a correspondence among path groups for which the same error will be associated with a path group PathG. In other words, the table contains information on which path group error is affected by a node error or a transmission line error, i.e., information on how a node error or a transmission error will be involved in a path group error. For example, the table in FIG. 3 indicates that, if an error occurs on one of paths of PathG (1), there is a high probability that the same error will occur in PathG (n) since Path G(n) contains the same error caused as Path G1). This is evident, as shown in FIG. 7, namely, an error that occurs on fiber-optic cable 1 (405) will affect both PathG(1) and PathG (n).

In this way, such information tells the system that an error that occurs on any one path will likely to occur on another, allowing the system, during error checking, to focus (give priority) on one or more paths in which an error is most likely to occur.

The path characteristics table 106 contains path class information (service classes or switching priorities) that is used in case where one path error affects a plurality of paths. The system uses path class information to determine the switching urgency or priority of each path so that it can perform path switching on paths in descending order of service class priority or urgency priority.

FIG. 4 shows an example of path characteristics table 106, which contains service class information and switching priority information on each path. In the path characteristics table 106 in FIG. 4, CBR (Constant Bit Rate), ABR (Available Bit Rate), UBR (Unspecified Bit Rate), and VBR (Variable Bit Rate) are shown.

As described above, a conventional path switching system switches individual paths independently of each other in an event-driven manner when a path error is detected (i.e., only after detecting an error or errors) and only when an error alarm is raised. As contrasted thereto, when a path error is detected, the path switching system according to the present invention urges to find, i.e., predicts, all the path errors that may be caused by the path error and acts accordingly. To do so, the system uses information contained in the path group management table 104, the path group relationship table 105, and path characteristics table 106 etc. This allows the system to perform switching according to the resultant priority and recovers the entire network very quickly.

Figure 5:
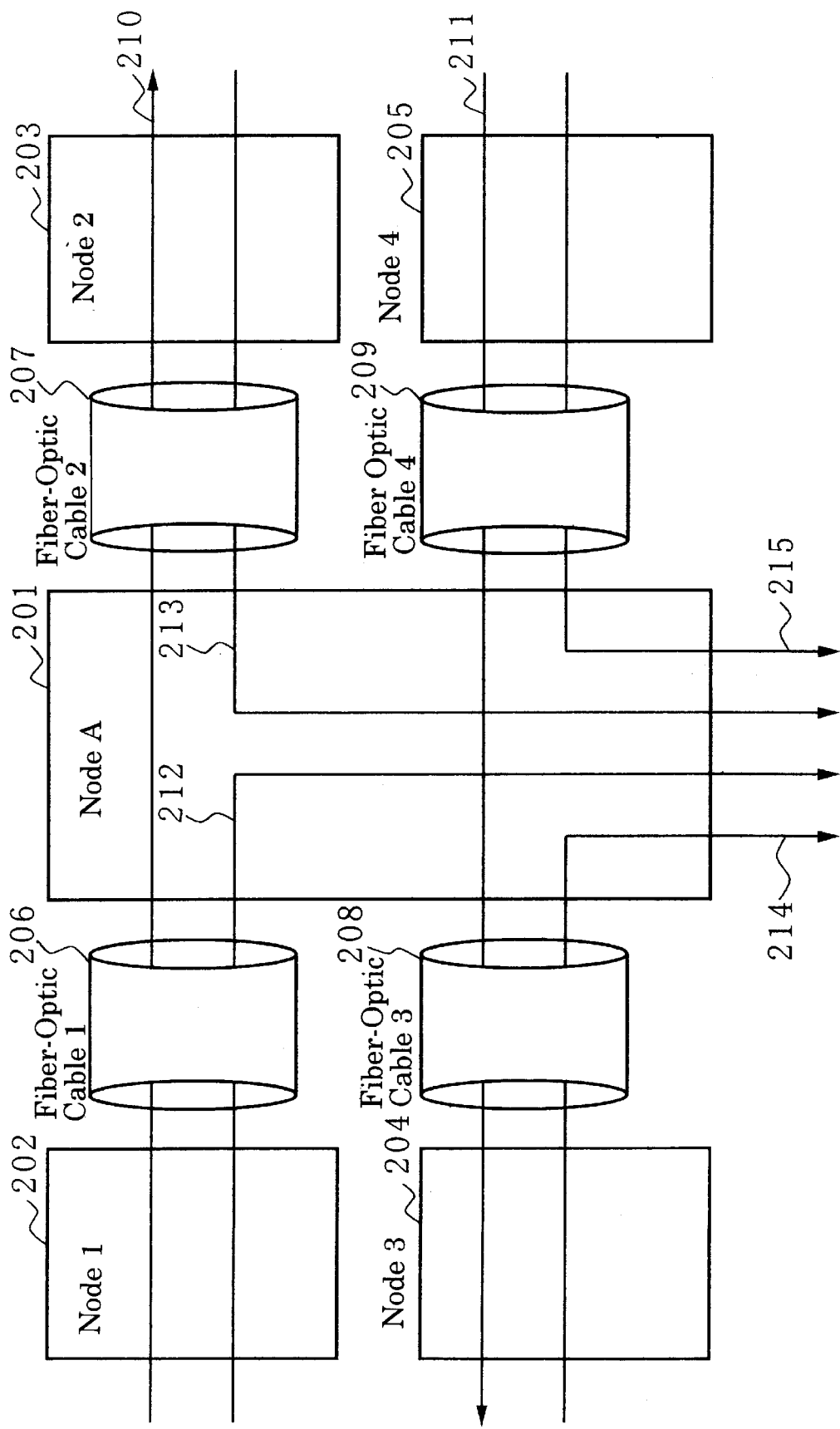
FIG. 5 is a network configuration diagram, with node A as its center, illustrating an embodiment according to the present invention.

FIG. 5 shows an example of network configuration with node A in the center. In the network shown in FIG. 5, four nodes, 1–4, are connected to node A with fiber-optic cables 1–4, respectively.

As shown in FIG. 5, a node is usually connected to a plurality of nodes over a plurality of transmission lines. For example, both a path 210 and a path 212 pass through node 1 and fiber-optic cable (termed as "fiber" in the figure) 1 and so they are considered to be affected by an error in node 1 or an error on fiber-optic cable 1. In this case, a path 214, passing through node 3 and fiber-optic cable 3, and a path 215, passing through node 4 and fiber-optic cable 4, are not affected by the error in node 1 or by the error on fiber-optic cable 1.

As shown in FIG. 5, there are paths connected to node A via fiber-optic cables other than fiber-optic cable 1 such as those connected via fiber-optic cable 2, fiber-optic cable 3, and fiber-optic cable 4. For simplicity, the following discussion deals only with paths connected to node A via fiber-optic cable 1. These paths are shown in FIG. 6.

In FIG. 6, it is termed that a group of paths (path (1) (1), path (1) (2), . . . ) connected to node (1) belong to PathG (1) (there are m paths), a group of paths (path (2) (1), path (2) (2), . . . ) connected to node (2) belong to PathG (2) (there are l paths), and a group of paths (path (3) (1), path (3) (2), . . . ) connected to node (3) belong to PathG (3) (there are k paths).

Now assume that a path error is detected at an entry point of node (A) and that no error is found in the paths under node (1), node (2), and node (3). Then, the source of the error may be located as follows, provided that any input error which may be caused from the groups of path elements (nodes and lines) disposed at subordinate levels to nodes (1),(2) and (3) is disregarded:

1. If an error is found in path group PathG (1), then the error is:
   node (1) error and/or a fiber-optic cable (1) error.
2. If an error is found in path group PathG (2), then the error is:
   a node (1) error and/or a fiber-optic cable (1) error and/or
   a node (2) error and/or a fiber-optic cable (2) error.
3. If an error is found in path group PathG (3), then the error is:
   a node (1) error and/or a fiber-optic cable (1) error and/or
   a node (2) error and/or a fiber-optic cable (2) error and/or
   a node (3) error and/or a fiber-optic cable (3) error.

Here, the "node error" refers to a system (hard ware) error including a path cross-connect error or hardware error, and the "fiber-optic cable error" refers to the degradation or disconnection of the fiber-optic cable.

It is understood that an error is more likely to occur in a path that is remoter (longer) from node A. That is, in FIG. 6, PathG (2) is more likely to be affected by errors than PathG (1), and PathG (3) than PathG (2). In other words, providing that the frequency of error is equal at each path element across a network, from the remoter (longer) a path is communicating to a node, the more likely an error occurs on the path.

From another viewpoint, it can also be said that an error on fiber-optic cable (1) equally affects paths in PathG (1), PathG (2) and PathG (3). Therefore, when a path error is found in PathG (1), it is most likely that an error also occurs on PathG (2) and PathG (3).

Another example is shown. Assume that at node A it has been detected that an error occurred in Path (1) (1) in path group PathG (1). As described above, it can be thought that the error occurred in node (1) and/or fiber-optic cable (1).

Assume that the error occurred in Path (1) (1) in path group PathG (1) because of an error in fiber-optic cable (1). In this case, it can be thought that all the other paths (Path (1) (2), Path (1) (3), . . . Path (1) (n - 1), Path (1) (n)) in the same path group (PathG) are also affected by the same error. In addition, because an error in fiber-optic cable (1) offers one of causes of error to path groups PathG (2) and PathG (3), the paths belonging to those path groups are also affected.

Thus, if an error in Path (1) (1) is detected at node A, it is likely that not only the paths in the same path group but also the paths in all the other path groups are most likely to be affected which are associated with the same possible source of the error.

In this manner, the system predicts one or more paths in which an error may occur before it actually occurs and takes action against it based on the error possibility information—for example, an actin that the system causes the path switching controlling module to check the presence of an error. This ensures high-speed switching.

FIG. 7 is a generalized view of the configuration shown in FIG. 6. (The configuration is composed of node (1)–node (n)).

The Path (1) group in FIG. 7 is referred to as PathG (1) (there are m paths), the Path (n - 1) group as PathG (n - 1) (there are l paths), and Path (n) group as PathG (n) (there are k paths), respectively. If a path error is detected in node A as in the example given above, the source of the error may be located/classified as follows:

1. If an error is found in path group PathG (1), then the error is:
   a node (1) error and/or a fiber-optic cable (1) error.
2. If an error is found in path group PathG (n - 1), then the error is:
   a node (1) error and/or a fiber-optic cable (1) error and/or
   a node (2) error and/or a fiber-optic cable (2) error and/or . . .
   a node (n - 1) error and/or a fiber-optic cable (n - 1) error.
3. If an error is found in path group PathG (n), then the error is:
   a node (1) error and/or a fiber-optic cable (1) error and/or
   a node (2) error and/or a fiber-optic cable (2) error and/or . . .
   a node (n - 1) error and/or a fiber-optic cable (n - 1) error and/or
   a node (n) error and/or a fiber-optic cable (n) error.

As compared with a conventional path switching system which switches individual paths independently in an event-driven manner only when an error or an alarm occurs, the path switching system according to the present invention is able to find all the errors which are most likely to occur in other paths and therefore recover the entire network very quickly.

To achieve this, the system stores information in advance for use in quick recovery. Namely assuming detecting an error, it investigates and identifies the possibility of the error affecting the other paths and store the resultant information. Then, when an error has actually happened and been detected on a specific path, the preliminary stored information is used to intelligently determine the possible influence of the detected error on the other paths, so as to attain a knowledge of a path error or errors concerned before actual detection. Based on such knowledge, the system performs detection of errors, judgment on switching and execution of switching.

In networks or nodes where a large number of paths (for instance, a maximum of 4096 virtual paths) must be processed, such as those used in ATM, the present invention ensures high speed and practical usefulness.

It should be noted that any modification may be done without departing from the gist and concept disclosed herein including appended drawings, within the scope of the claims as appended herewith.

What is claimed is:

1. A path switching apparatus for a node, said node having a plurality of path groups each having respective paths, said plurality of path groups including at least one path group and another path group, said respective paths of said one path group including a first respective path and other respective paths, said path switching apparatus comprising:
   an error detecting module monitoring said one path group;
   an information storage module including information previously stored; and
   a control module communicating with said error detecting module and said information storage module;
   wherein:
      when said error detecting module detects an error on said first respective path, said control module is provided with corresponding error detection information;
      said control module is responsive to said error detection information to:
         make a determination based on said information previously stored, as to a possibility of errors in said other respective paths of said one path group and in said respective paths of said another path group, and then
         make a switching judgement concerning said one path group and said another path group based on said determination as to said possibility of errors.

2. The path switching apparatus as defined in claim 1, wherein:
   said information previously stored includes a possibility of an error on said first respective path affecting the respective paths of other ones of said path groups;
   said determination is a prediction of error and is based on said possibility of said error on said first respective path affecting the respective paths of said other path groups; and
   said control module executes switching based on said prediction.

3. The path switching apparatus as set forth in claim 1 or 2, wherein
   said information previously stored includes path group management information;
   said path group management information indicates identities of said respective paths for said path groups, said path groups being defined by ones of said paths passing through a same physical node and a same physical transmission line; and
   when said determination is made with respect to said other respective paths of said one path group, an error for said other respective paths is judged based on said information previously stored.

4. The path switching apparatus as set forth in claim 1 or 2, wherein:
   said information previously stored includes path group relationship information representing the influence of one or more of a node error and a transmission error on said path groups; and
   when said determination is made with respect to said other respective paths of said one path group, an error for said other respective paths is judged based on said information previously stored.

5. The path switching apparatus as set forth in claim 1 or 2, wherein:
   said information previously stored includes path characteristic information representing a service class and a switching priority of each of said respective paths for each of said path groups; and
   said switching judgment includes an order of switching for said respective paths, and is based on said path characteristic information.

6. The path switching apparatus as set forth in claim 1 or 2, wherein:
   said information previously stored includes:
      path group management information indicating identities of said respective paths for said path groups, said path groups being defined by ones of said paths passing through a same physical node and a same physical transmission line,
      path group relationship information representing the influence of one or more of a node error and a transmission error on said path groups, and
      path characteristic information representing a service class and a switching priority of each of said respective paths for each of said path groups;
   said switching judgment is based on said path group management information, said path group relationship information, and said path characteristic information; and
   said control module commands a switching operation based on said switching judgment and in an order based on said path characteristic information.

7. The path switching apparatus as defined in claim 1, wherein said error detection information is stored grouped by said path groups and by a common error possibility associated with an error in one or more of:
   said plurality of paths, and
   said path groups.

8. A switching method for paths, comprising:
   storing information on the possibility of an influence of one of said paths affecting others of said paths; then
   detecting a path error on said one of said paths; then
   making a prediction of the influence of said path error on said others of said paths based on said stored information; and then
   when said prediction indicates an error also on one or more of said others of said paths, switching said one or more of said others of said paths based on said prediction.

9. A path switching system for a node having paths, said system comprising:
   (a) a path switching controlling module controlling switching of said paths;
   (b) a plurality of error detecting modules monitoring a respective one of a plurality of groups of said paths, said groups of said paths defining path groups;
   (c) path group management information representing the possibility that an error in one of said paths indicates an error in one or more other ones of said paths;
   (d) path group relationship information representing the possibility that an error in said paths of one of said path groups indicates an error in one or more others of said path groups;
   wherein the path switching controlling module performs the steps of:
      detecting an error in one of said paths of one of said path groups; and then
      predicting an error possibility for others of said paths based on said path group management information and said path group relationship information; and then
      selectively performing error detection processing for said others of said paths in accordance with said predicted error possibility, and then
      making a switching judgment pertaining to said others of said paths.

10. The path switching apparatus as set forth in claim 9, wherein:
- said information previously stored includes path characteristic information representing a service class and a switching priority of each of said respective paths for each of said path groups; and
- said switching judgment includes an order of switching for said respective paths, and is based on said path characteristic information.

\* \* \* \* \*